(12) United States Patent
Tanaka et al.

(10) Patent No.: US 6,702,056 B2
(45) Date of Patent: Mar. 9, 2004

(54) SEATBELT RETRACTOR

(75) Inventors: Koji Tanaka, Moriyama (JP); Hiromasa Tanji, Kyoto (JP); Tomoji Matsui, Hikone (JP)

(73) Assignee: Takata Corporation, Tokyo (JP)

( * ) Notice: Subject to any disclaimer, the term of this patent is extended or adjusted under 35 U.S.C. 154(b) by 27 days.

(21) Appl. No.: 10/225,121

(22) Filed: Aug. 22, 2002

(65) Prior Publication Data
US 2002/0189880 A1 Dec. 19, 2002

Related U.S. Application Data

(63) Continuation of application No. 09/631,728, filed on Aug. 3, 2000, now Pat. No. 6,499,554.

(30) Foreign Application Priority Data

Aug. 6, 1997 (JP) .............................. 11-223954
May 24, 2000 (JP) ........................................ 2000-153220
Sep. 12, 2001 (JP) ........................................ 2001-276110

(51) Int. Cl.⁷ ............................................. B60R 21/00
(52) U.S. Cl. ......................... 180/269; 280/806; 280/807
(58) Field of Search ................................. 180/268, 269, 180/270; 280/803, 806, 807; 247/480

(56) References Cited

U.S. PATENT DOCUMENTS

| | | | | |
|---|---|---|---|---|
| 4,456,196 A | * | 6/1984 | Takada et al. | 242/385 |
| 4,534,441 A | * | 8/1985 | Kamijo et al. | 180/268 |
| 4,570,872 A | * | 2/1986 | Tsujimura et al. | 242/390.8 |
| 4,588,144 A | * | 5/1986 | Nishimura | 242/375.3 |
| 4,858,953 A | * | 8/1989 | Nishimura et al. | 280/807 |
| 5,087,075 A | * | 2/1992 | Hamaue | 280/806 |
| 5,261,696 A | * | 11/1993 | Hamaue | 280/802 |
| 5,292,153 A | * | 3/1994 | Mishina | 280/807 |
| 5,316,233 A | * | 5/1994 | Hiramatsu | 242/372 |
| 5,788,281 A | * | 8/1998 | Yanagi et al. | 280/806 |
| 5,931,401 A | * | 8/1999 | Rink | 242/374 |
| 6,371,397 B1 | * | 4/2002 | Specht | 242/375.1 |
| 6,499,554 B1 | * | 12/2002 | Yano et al. | 180/268 |
| 6,604,597 B2 | * | 8/2003 | Fujii et al. | 180/268 |

FOREIGN PATENT DOCUMENTS

JP   2002-104135   4/2002

* cited by examiner

Primary Examiner—Paul N. Dickson
Assistant Examiner—Toan C To
(74) Attorney, Agent, or Firm—Kanesaka & Takeuchi

(57) ABSTRACT

A seatbelt retractor is capable of winding a seatbelt webbing on a spool driven by a spring and a motor. The seatbelt retractor includes a motor-power transmission device for controlling a motor-power transmission path to turn on and off transmission of motor power to the spool. The motor-power transmission device turns on only when the motor rotates in the belt winding direction to connect the motor-power transmission path and transmit the motor power to the spool. After a specific period of time since a buckle-releasing signal detecting release of a tongue from a buckle is received from a buckle switch, the motor control device rotates the motor in the belt winding direction. When a winding speed of the seatbelt webbing by the spring becomes less than a constant value, the motor-power transmission device is set to turn on so as to connect the motor-power transmission path.

4 Claims, 7 Drawing Sheets

SEATBELT RETRACTOR

CROSS REFERENCE TO RELATED APPLICATION

This is a continuation-in-part application of Ser. No. 09/631,728 filed on Aug. 3, 2000 now U.S. Pat. No. 6,499,554.

BACKGROUND OF THE INVENTION AND RELATED ART STATEMENT

The present invention relates to a seatbelt retractor that is equipped in a vehicle such as an automobile for controlling extraction and retraction of a seatbelt and for restraining and protecting an occupant. More specifically, the present invention relates to a seatbelt retractor in which an occupant is more securely restrained and protected by retracting a seatbelt with a motor based on a situation outside a vehicle and operational conditions of the seatbelt so as to control belt tension, while when the seatbelt is not in use, the seatbelt is mechanically retracted with a spring.

Conventionally, in a seatbelt apparatus equipped in a vehicle such as an automobile, upon an emergency such as a vehicle collision in which large deceleration is applied to the vehicle, a seatbelt restrains an occupant to keep from jumping out of a seat and protects the occupant.

Such a seatbelt apparatus is provided with a seatbelt retractor for retracting the seatbelt. The seatbelt retractor comprises a spring such as a power spring for constantly urging a spool for winding the seatbelt in a winding direction. By virtue of the urging force of the spring, the seatbelt is wound about the spool when the seatbelt is not worn. When wearing the seatbelt, the seatbelt is extracted against the spring urging force for the occupant to wear. Upon the emergency as mentioned above, the seatbelt retractor blocks the extraction of the seatbelt by blocking the rotation of the spool in an extraction or withdrawing direction because of an operation of locking means. The occupant is thereby restrained and protected securely with the seatbelt upon the emergency.

In such a conventional seatbelt apparatus, while wearing the seatbelt, a substantially constant belt tension due to the spring urging force is applied to the seatbelt. Therefore, the seatbelt retractor is set to operate in substantially the same manner regardless of situations between the vehicle and surrounding objects. Although the conventional seatbelt apparatus can securely restrain and protect the occupant upon an emergency, as described above, it is difficult for the apparatus to control the occupant comfortably during a normal state other than the emergency. Moreover, upon the emergency, it is preferable to protect the occupant more securely by firmly restraining the occupant.

From the above point of view, the inventor has filed a patent application on a seatbelt retractor. The seatbelt retractor can restrain and protect an occupant more efficiently and more comfortably by controlling a rotation of a spool so as to adjust a belt tension with a motor depending on situations between the vehicle and surrounding objects. Moreover, the seatbelt retractor can simply and securely adjust the belt tension with a simple structure for adjusting the belt tension (U.S. patent application Ser. No. 09/631,728 corresponding to Japanese Patent Publication No. 2000-238735).

The seatbelt retractor according to the invention in the patent publication can be easily understood in detail with reference to a specification and drawings of the publication. Here, parts relating to the present invention will be described.

FIGS. 1 to 3 is drawings showing the seatbelt retractor according to the invention in the patent publication.

As shown in FIGS. 1 and 2, a seatbelt retractor 1 according to the patent publication comprises at least a power-transmission gear mechanism 11 for transmitting power of a motor 10; a reducer mechanism 12 comprising a planetary gear mechanism for reducing the rotation of the motor 10 transmitted from the power-transmission gear mechanism 11 to a spool 4; a power-transmission route switching mechanism 13 for selectively switching between states that the power of the motor 10 is transmitted to the spool 4 and the rotation of the spool 4 is not transmitted to the motor 10; and spring means 14 for urging the spool 4 in a winding direction, i.e. a counter-clockwise (CCW) direction, of a seatbelt 3. An operation of this seatbelt retractor 1 will be described next.

(1) Non-Operational State of Seatbelt Retractor 1 (Total Amount Seatbelt Stored State)

In the non-operational state of the seatbelt retractor 1, the total amount of seatbelt webbing 3 is wound around the spool 4 by the spring means 14, while the motor 10 is not in operation. In the non-operational state, as shown in FIG. 2, a motor gear 36, connecting gears 37, and a switching gear 46, which are attached to a rotational shaft 10a of the motor 10, are not rotated, so that the switching gear 46 is set at a limited position (a right limited position shown in FIG. 1) perpendicular to the plane of FIG. 2 on the other side across the drawing. A plunger 47 protrudes at most from a cylinder housing 51 so that a front inclined surface (not shown) of an abutting part 47c abuts against a front inclined surface 46b of the switching gear 46. In this state, a retainer lever 49 is set at a position that a retainer claw 49c does not engage a ratchet gear 44b of an internal gear 44 so as to set a power-transmission route off. Therefore, the internal gear 44 is rotatable in any one of the belt extracting or withdrawing directions, i.e. the clockwise (CW) direction, and the belt winding direction, i.e. the CCW direction.

(2) Seatbelt Extracting Operation

When the seatbelt webbing 3 is extracted from the seatbelt extractor 1 in the non-operational state mentioned above, the spool 4 rotates in the belt extracting CW direction. Then, the second torque-transmission part 26d of a torsion bar 26 and the second carrier 56 shown in FIG. 1 simultaneously rotate in the belt extracting CW direction. Since the first carrier 38 is thereby rotated in the same CW direction, planetary gears 39 and 40 move around a sun gear 43 in the same CW direction. Therefore, respective large planetary gears 39a and 40a of the planetary gears 39 and 40 rotate in the belt extracting CW direction so as to rotate the sun gear 43 in the belt winding CCW direction. On the other hand, respective small planetary gears 39b and 40b rotate in the belt winding CCW direction so as to rotate the internal gear 44 in the belt winding CCW direction. At this time, a reducer gear 45 is constantly meshed with the sun gear 43; a small-diameter connecting gear 37b of the connecting gears 37 is constantly meshed with an outer tooth 45b of the reducer gear 45; and the motor gear 36 and the switching gear 46 are constantly meshed with a large-diameter connecting gear 37a integrated with the small-diameter connecting gear 37b, so that the sun gear 43 does not rotate because a predetermined rotational resistance is applied to the sun gear 43, whereas the internal gear 44 is freely rotatable as mentioned above. At this time, the small planetary gears 39b and 40b also rotate in the belt extracting CW direction together with the respective large planetary gears 39a and 40a, while the internal gear 44 rotates in the same CW direction.

Since the sun gear 43 does not rotate, the rotation of the spool 4 during the extraction of the seatbelt webbing 3 in the belt extracting CW direction is not transmitted to the switching gear 46, so that the power-transmission route switching mechanism 13 does not operate and the power-transmission route between the spool 4 and the motor 10 is kept off. Thus, the rotation of the spool 4 is not transmitted to the motor 10, which is not affected by the rotation of the spool 4.

In addition, when extracting or withdrawing the belt, the second torque-transmission part 26d is rotated by the rotation of the spool 4, so that a return spring 54 of the spring means 14 is wound up through a first shaft 26f and a bushing 53 fitted to spline grooves 26e of the first shaft 26f so as to gradually increase the spring force corresponding to the amount of the belt extraction.

(3) Seatbelt Winding Operation by Spring means 14

When a hand is off from the seatbelt webbing 3 in the state that the seatbelt webbing 3 is extracted, the spool 4 is rotated in the belt winding CCW direction by the urging force of the wound-up return spring 54 of the spring means 14 through the bushing 53, the first shaft 26f, the second torque-transmission part 26d, and the second carrier 56. Simultaneously, the first carrier 38 is rotated by the rotation of the second carrier 56 in the same CCW direction, so that the planetary gears 39 and 40 move around the sun gear 43 in the same CCW direction. Therefore, the respective large planetary gears 39a and 40a of the planetary gears 39 and 40 rotate in the belt winding CCW direction so as to rotate the sun gear 43 in the belt extracting CW direction. On the other hand, the respective small planetary gears 39b and 40b of the planetary gears 39 and 40 rotate in the belt extracting CW direction so as to rotate the internal gear 44 in the belt extracting CW direction. At this time, whereas a predetermined rotational resistance is applied to the sun gear 43, as mentioned above, the sun gear 43 does not rotate as the internal gear 44 is freely rotatable. Therefore, the small planetary gears 39b and 40b also rotate together with the respective large planetary gears 39a and 40a in the belt winding CCW direction. Then, the internal gear 44 is finally rotated in the belt winding CCW direction by the rotation of the small planetary gears 39b and 40b in the belt winding CCW direction.

Because the sun gear 43 does not rotate, during winding of the seatbelt webbing 3 in the belt winding CCW direction due to the spring means 14, the rotation of the spool 4 is not transmitted to the switching gear 46. Thus, the power-transmission route switching mechanism 13 does not operate, leaving the power-transmission route between the spool 4 and the motor 10 off. Therefore, the rotation of the spool 4 is not transmitted to the motor 10, which is not affected by the rotation of the spool 4.

(4) Seatbelt Winding Operation by Motor Power

As shown in FIG. 2, the retainer claw 49c of the retainer lever 49 is not brought into an engagement with the ratchet gear 44b of the internal gear 44 separating therefrom, so that a motor-power transmission device is maintained off and the internal gear 44 is freely rotatable.

In this state, when the motor 10 is driven so that the spool 4 rotates in the belt winding CCW direction, the motor gear 36 fixed to the rotational shaft 10a of the motor 10 (shown in FIG. 2) rotates in the belt winding CCW direction (the CCW direction in FIG. 2) and the large-diameter gear 37a of the connecting gears 37 meshed with the motor gear 36 rotates in the belt extracting CW direction (the CW direction in FIG. 2), so that the connecting gears 37 are rotated in a reduced rotation in the belt extracting CW direction. Then, as the reducer gear 45 meshed with the small-diameter gear 37b of the connecting gears 37 is rotated in further reduced rotation in the belt winding CCW direction, the sun gear 43 rotating integrally with the reducer gear 45 rotates in the same CCW direction at the same speed as that of the reducer gear 45. By the rotation of the sun gear 43, the planetary gears 39 and 40 meshed with the sun gear 43 are rotated in further reduced rotation on their axes in the belt extracting CW direction, and the internal gear 44 meshed with the planetary gears 39 and 40 rotates in the same CW direction. As the internal gear 44 rotates at this time, the planetary gears 39 and 40 do not rotate around the sun gear 43. Therefore, because the first carrier 38 rotatably supporting the planetary gears 39 and 40, and idle gears 41 and 42 do not rotate, the power of the motor 10 is not transmitted to the spool 4 rotatably connected to the first carrier 38 via the second carrier 56, so that the spool 4 does not rotate by the power of the motor 10.

Through the rotation of the connecting gears 37, the switching gear 46 meshed with the large-diameter gear 37a of the connecting gears 37 also rotates in the belt winding CCW direction simultaneously. In this case, since the large-diameter gear 37a of the connecting gears 37 and the switching gear 46 are arranged to engage in a helical-gear engagement, an axial force is applied to the switching gear 46 in an axial direction. The axial force moves the switching gear 46 in the direction perpendicular to the plane of FIG. 2 on this side of the drawing. At this time, with the switching gear 46 moving in the axial direction, an inclined surface of the abutting part 47c in the plunger 47 slides along the inclined surface 46b of the switching gear 46 so as to move in the direction that the plunger 47 separates from the switching gear 46 and to be brought into the cylinder housing 51.

Then, as the switching gear 46 is finally supported to the second retainer 35 in the thrust direction, the switching gear 46 stops moving in the axial direction and is arranged at a limited position on this side of FIG. 2. In this state, the plunger 47 is brought into the cylinder housing 51 to the utmost, so that the end of the abutting part 47c abuts against an outer periphery of a gear part 46a of the switching gear 46. By the pulling-in operation of the plunger 47, as shown in FIG. 3, a retainer-lever operational part 47d presses an operational-lever 49b of the retainer lever 49 so that the retainer lever 49 rotates about a rotational shaft 49a and the retainer claw 49c is arranged at a position being able to engage the ratchet gear 44b.

Then, through the rotation of the internal gear 44 in the belt extracting CW direction, the ratchet gear 44b is brought into an engagement with the retainer claw 49c so as to stop the rotation of the internal gear 44. When the motor 10 is driven in such a manner, the retainer lever 49 is promptly operated so as to stop the rotation of the internal gear 44 in the belt extracting CW direction, and the motor-power transmission device between the spool 4 and the motor 10 is set on.

In this state, as the planetary gears 39 and 40 are rotated on their axes by the power of the motor 10, the planetary gears 39 and 40 are rotated in the reduced condition around the sun gear 43 in the belt winding CCW direction along the internal teeth 44a of the internal gear 44 as the rotation of the internal gear 44 is stopped. Accordingly, the first and second carriers 38 and 40 rotate at an orbital speed of the planetary gears 39 and 40 in the belt winding CCW direction, and the spool 4 rotates in the belt winding CCW direction. In such a manner, the motor 10 is rotated in the reduced speed at a predetermined reduction ratio by the reducer mechanism 12 and is transmitted, so that the spool 4 is rotated. By the rotation of the spool 4 in the belt winding CCW direction, the seatbelt webbing is wound around the spool 4 by the power of the motor 10.

In this case, the return spring 54 is unwound by the rotation of the second carrier 56 in the belt winding CCW direction, so that the spring force of the return spring 54 is reduced.

(5) Release of Seatbelt Winding Operation by Motor Power

When the motor 10 is rotationally driven in a direction opposite to the belt winding CCW direction, i.e. the belt extracting CW direction, the spool 4 is rotated in the belt extracting CW direction via the gears 36, 37, 45, 43, 39, and 40, the first and second carriers 38 and 56, so as to loose the winding of the seatbelt webbing 3. By the rotation of the connecting gears 37, the switching gear 46 also rotates inversely; at this time, the large-diameter connecting gear 37a is meshed with the switching gear 46 in a helical-gear engagement, so that an axial force in a direction opposite to that mentioned above is applied to the switching gear 46 from the large-diameter connecting gear 37a. Then, the switching gear 46 moves to a position perpendicular to the plane of FIG. 3 on the other side across the drawing from the limited position on this side of the drawing. Then, by the movement of the switching gear 46, when an upper end of the inclined surface 46b of the switching gear 46 passes a lower end of an inclined surface 47b in the plunger 47, the inclined surface 47b of the plunger 47 abuts against the inclined surface 46b while protruding along the inclined surface 46b. By the protruding operation of the plunger 47, the retainer-lever operational part 47d of the plunger 47 rotates the retainer lever 49 toward the non-operational position.

Finally, the switching gear 46 and the plunger 47 become the initial non-operational state together. In this non-operational state, the retainer lever 49 is located at the non-operational position, so that the retainer claw 49c is arranged at the non-engagement position where the internal gear 44 is not brought into an engagement with the ratchet gear 44b. That is, the power-transmission route switching mechanism 13 is set off. Therefore, the internal gear 44 becomes rotatable, and the spool 4 and the motor 10 are rotationally free from each other.

In such a manner, the motor-power transmission device 5 for transmitting the power of the motor 10 to the spool 4 comprises the power-transmission gear mechanism 11, reducer mechanism 12, and power-transmission route switching mechanism 13. In this case, when the retainer claw 49c is not brought into an engagement with the ratchet gear 44b, the motor-power transmission device 5 is off and the power of the motor 10 is not transmitted to the spool 4. When the retainer claw 49c is brought into an engagement with the ratchet gear 44b, the motor-power transmission device 5 is on and the power of the motor 10 is transmitted to the spool 4.

By the power of the motor 10 controlled by a CPU 6, the winding of the seatbelt webbing 3 is controlled according to situations of occupants in the vehicle, driving situations outside the vehicle, or operational situations of the seatbelt webbing 3.

Next, in the seatbelt retractor 1, a case will be considered in which the winding of the seatbelt webbing 3 is performed by the spring means 14 for storing the entire amount of the seatbelt webbing 3.

As described above, when the spring means 14 is winding the seatbelt webbing 3, the spool 4 is rotated by the urging force of the spring means 14 in the belt winding CCW direction, so that the internal gear 44 tries to rotate in the belt winding CCW direction, whereas the internal gear 44 tries to rotate in the belt extracting CW direction when the motor 10 rotates in the belt winding CCW direction. Assume that a rotational rate of the internal gear 44 in the belt winding CCW direction during the winding of the seatbelt webbing 3 by the spring means 14 is VS, and the rotational rate of the internal gear 44 in the belt extracting CW direction during the rotation of the motor 10 in the belt winding CCW direction is VM. When VS is greater than VM, the internal gear 44 rotates in the belt winding CCW direction, whereas, inversely, when VM is greater than VS, the internal gear 44 rotates in the belt extracting CW direction.

Also, as described above, during the rotation of the motor 10 in the belt winding CCW direction, the retainer claw 49c of the retainer lever 49 is located at a position where the retainer claw can engage the ratchet gear 44b of the internal gear 44.

Therefore, when VS is greater than VM, the internal gear 44 rotates in the belt winding CCW direction, so that even when the retainer claw 49c is located at the position where the retainer claw can engage the ratchet gear 44b, the retainer claw 49c is not brought into an engagement with the ratchet gear 44b and the motor-power transmission device 5 is set off. When VM is greater than VS, the internal gear 44 rotates in the belt extracting CW direction, the retainer claw 49c is brought into an engagement with the ratchet gear 44b and the motor-power transmission device 5 is set on.

Furthermore, in the seatbelt retractor 1 according to the patent publication, when the seatbelt webbing 3 is not in use, the entire amount of the seatbelt webbing 3 is mechanically wound by the spring means 14. In the specification and drawings of the present invention, the entire amount of the seatbelt webbing 3 indicates a wound state of the seatbelt webbing 3 during the non-operational state of the seatbelt retractor 1 described above, i.e. when the seatbelt webbing 3 is not in use. There is no slack in the seatbelt webbing 3 so as not to be wound any more.

According to the patent publication, the configuration of the seatbelt retractor 1 relating to the present invention is summarized and schematically shown in FIG. 4.

As shown in FIG. 4, the seatbelt retractor 1 according to the formally filed patent application comprises at least the spool 4 for winding the seatbelt webbing 3; the spring means 14 for constantly urging the spool 4 in the belt winding direction and for winding the seatbelt webbing 3 so as to store the entire amount of the seatbelt webbing 3 during the non-wearing of the seatbelt webbing 3; the motor 10 for rotating the spool 4 to wind the seatbelt webbing 3 according to the vehicle situations and the like mentioned above; the motor-power transmission device 5 for controlling the transmitting and shutting off the power of the motor 10 to the spool 4; the motor control device (CPU) 6 for controlling the drive of the motor 10 with an electrical signal; and a buckle switch 7 for outputting an electrical buckle-engagement signal to the CPU 6 by turning on when a tongue is brought into an engagement with a buckle and also for outputting an electrical buckle-release signal by turning off when the engagement between the tongue and the buckle is released.

As described above, in the seatbelt retractor 1 according to the patent publication, in case that the entire amount of seatbelt webbing 3 is stored in the retractor in the non-wearing state thereof, the entire amount of the seatbelt webbing 3 is mechanically stored by the spring means 14.

However, because of aging of spring characteristics of the return spring 54 in the spring means 14 due to a long term usage of the seatbelt retractor or the like, the winding force of the return spring 54 can not be efficiently utilized, so that it may be difficult to wind the entire amount of the seatbelt webbing 3. Therefore, even when the winding force of the return spring 54 can not be efficiently utilized because of the aging and so on, it is required to be able to securely store the entire amount of the seatbelt webbing 3.

In view of such a situation, the present invention has been made, and it is an object thereof to provide a seatbelt retractor capable of securely winding the entire amount of seatbelt webbing even when the winding force of a spring can not be efficiently utilized.

Further objects and advantages of the invention will be apparent from the following description of the invention.

SUMMARY OF THE INVENTION

In order to solve the problems described above, a seatbelt retractor according to the present invention is capable of winding a seatbelt webbing by rotating a spool in a belt winding direction with a spring while winding the seatbelt webbing by rotating the spool in the belt winding direction by controlling a motor with a motor control device. The seatbelt retractor comprises a motor-power transmission device for controlling a motor-power transmission path to turn on and off a transmission of the motor power to the spool. The motor-power transmission device turns on only when the motor rotates in the belt winding direction so as to connect the motor-power transmission path and transmit the motor power to the spool. After a specific period of time since a buckle-releasing signal detecting release of an engagement between the tongue and the buckle is received from the buckle switch, the motor control device rotates the motor in the belt winding direction. When a winding speed of the seatbelt webbing by the spring becomes less than a constant value, the motor-power transmission device is set to turn on so as to connect the motor-power transmission path.

According to the second aspect of the invention, in a normal state, the motor-power transmission device turns off so as to shut off the motor-power transmission path by setting a winding speed of the seatbelt webbing during winding by the spring, which is input in the motor-power transmission device, to be larger than a winding speed by the motor power, which is input in the motor-power transmission device. The motor-power transmission device turns on so as to connect the motor-power transmission path when a winding speed of the seatbelt webbing during winding by the spring, which is input in the motor-power transmission device, becomes smaller than a winding speed by the motor power, which is input in the motor-power transmission device in a case that a winding speed of the seatbelt webbing by the spring becomes less than a specific value.

Furthermore, in the third aspect of the invention, a retractor further comprises a motor current detector for detecting a motor current of the motor. Based on a motor current detection signal from the motor current detector, the motor control device stops the motor when detecting an increase in the motor current due to completion of winding the entire amount of the seatbelt webbing about the spool.

Furthermore, in the fourth aspect of the invention, the motor control device measures, or count, a period of time from the start of the motor rotation in the belt winding direction to detection of the increase in the motor current so as to control a driving output of the motor according to the counted value.

In the seatbelt retractor according to the present invention configured in such a manner, the motor control device rotates the motor when a buckle-release signal from the buckle switch is received. Also, when the winding speed of the seatbelt webbing during winding by the spring is decreased from the normal winding speed to become a predetermined value, the motor-power transmission device turns on so as to connect the motor-power transmission path. Therefore, even when the winding force of the spring can not be effectively utilized, the entire amount of the seatbelt webbing can be securely wound up.

In particular, in the second aspect of the invention, when the winding speed of the seatbelt webbing during winding by the spring is decreased to be less than a predetermined value so that the winding speed by the motor power rather becomes larger than the winding speed of the seatbelt webbing during winding by the spring, which is input in the motor-power transmission device, the motor-power transmission device is turned on. Therefore, the motor-power transmission path is simply connected mechanically so that the seatbelt webbing is wound about the spool by the motor power.

In the third aspect of the invention, when the motor control device detects that the motor stalls and the motor current increases upon the completion of seatbelt winding by the spool based on a motor current detection signal from the motor current detector, the motor is stopped. In such a manner, by simply detecting the increase in the motor current, the completion of the seatbelt winding can be simply detected, so that the motor is securely stopped.

Furthermore, in the fourth aspect of the invention, the motor control device controls a driving output of the motor according to a period of time from the start of the motor rotation in the belt winding direction to the detection of the increase in the motor current. In such a manner, by controlling the driving output of the motor according to an extent of difficulty in utilizing the winding force of the spring efficiently, the driving of the motor is optimally controlled so that the motor power can be utilized efficiently.

DETAILED DESCRIPTION OF PREFERRED EMBODIMENTS

Hereunder, embodiments according to the present invention will be described with reference to the accompanied drawings.

Figure 1:
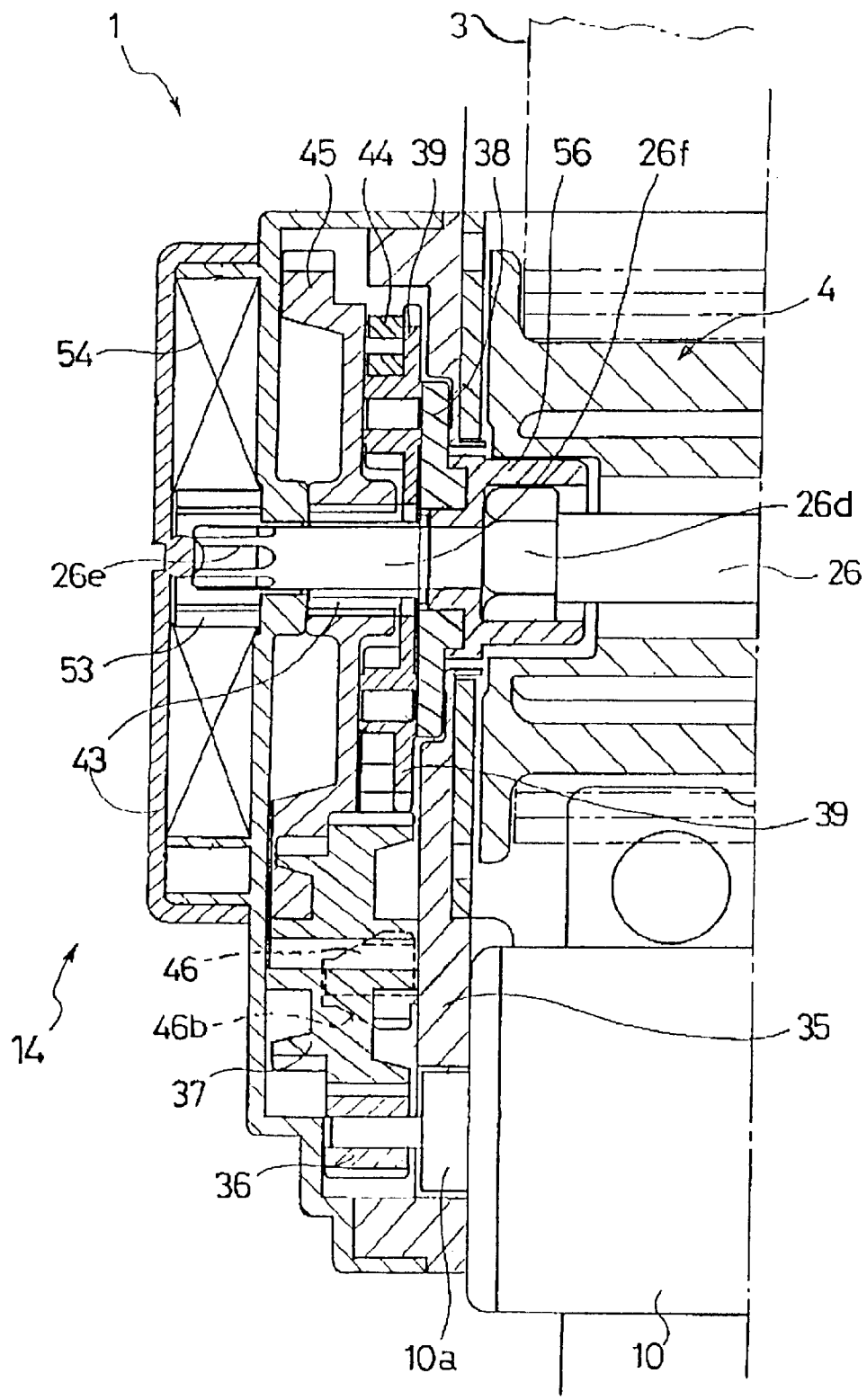
FIG. 1 is a partial sectional view showing a seatbelt retractor according to Japanese Patent Publication No. 2000-238735.
Figure 2:
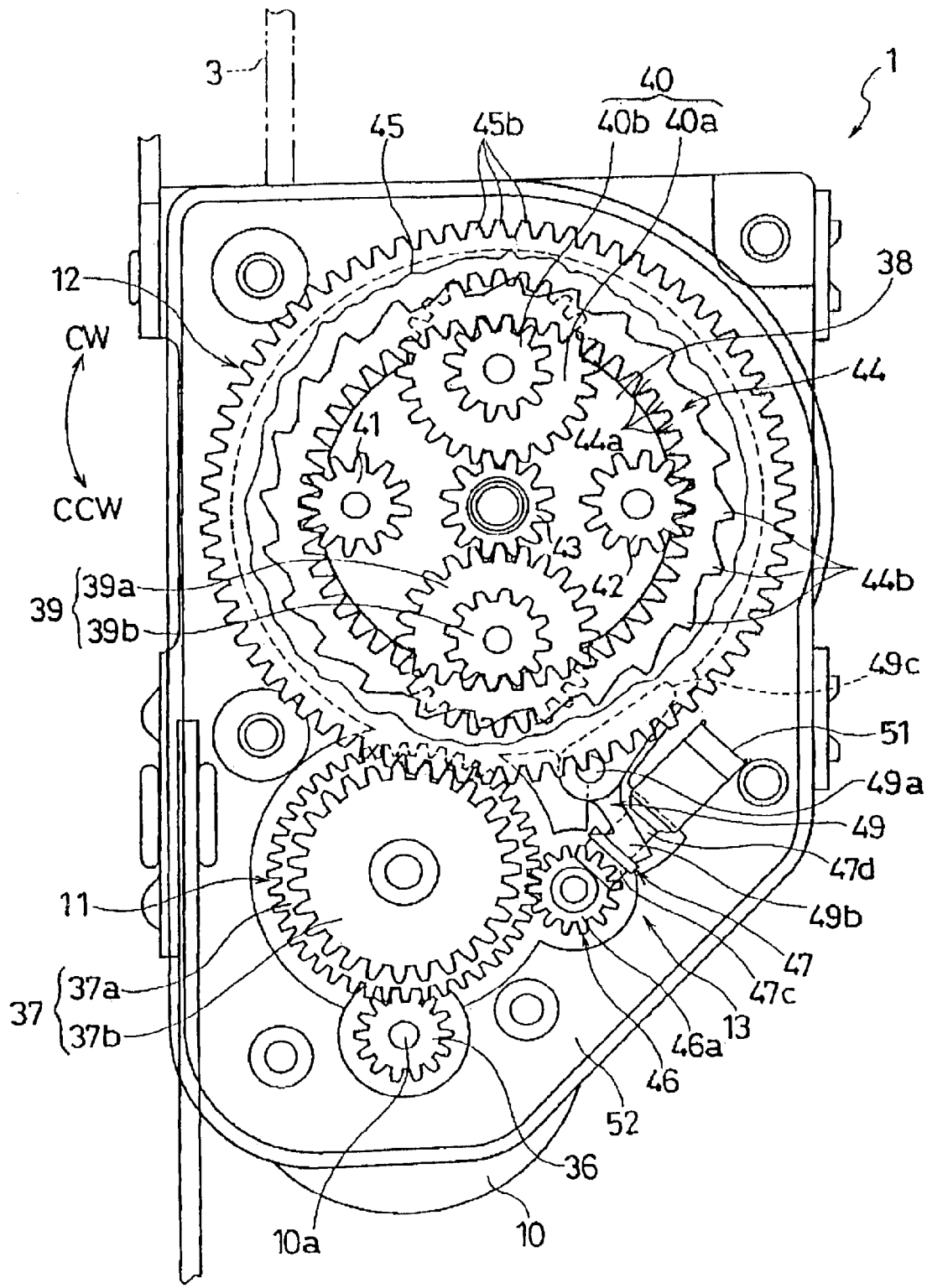
FIG. 2 is a side view showing the seatbelt retractor shown in FIG. 1 except spring means and showing an off state of a motor-power transmission device.
Figure 3:
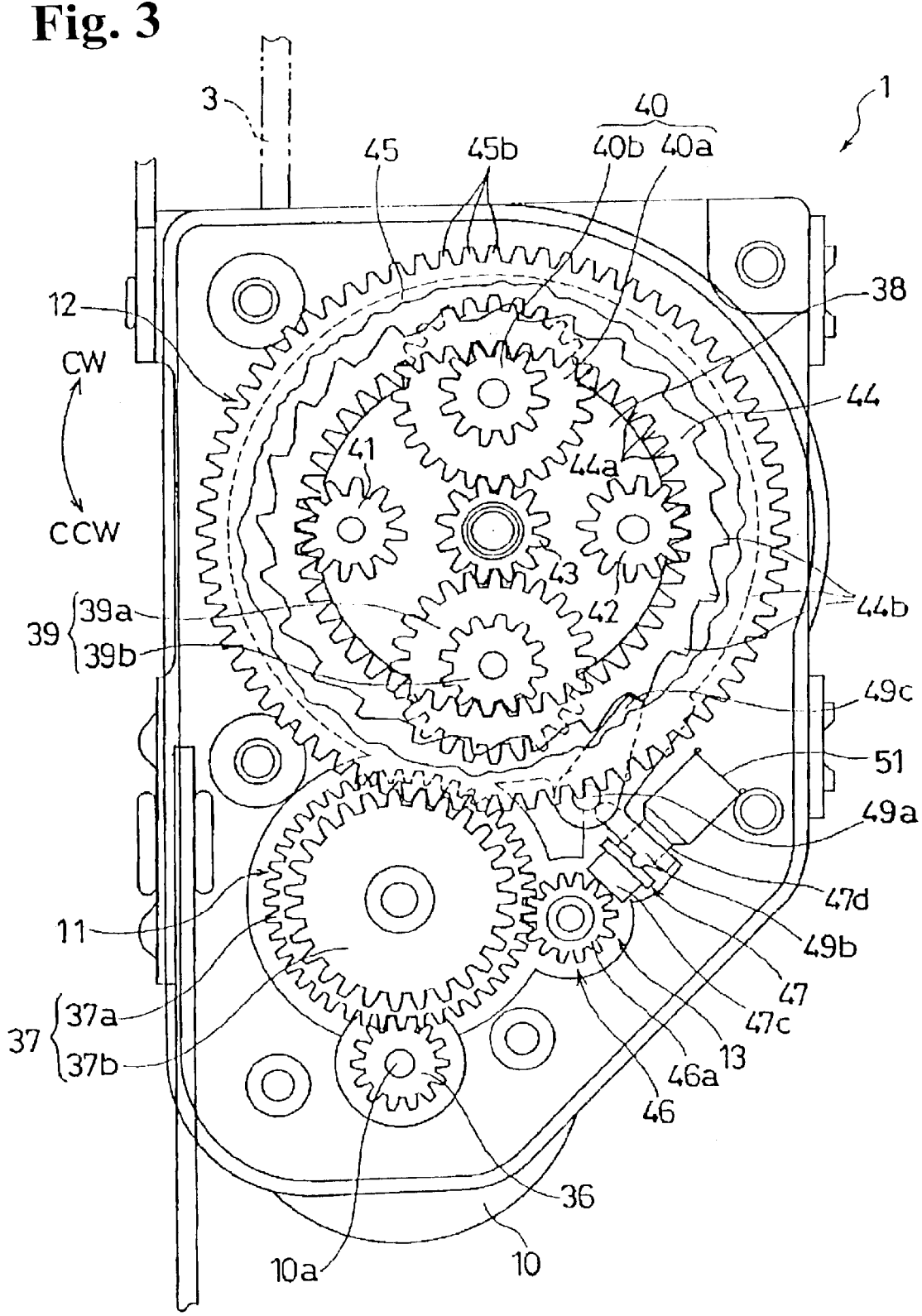
FIG. 3 is a side view showing the seatbelt retractor shown in FIG. 1 except the spring means and showing an operation state of the motor-power transmission device.
Figure 4:
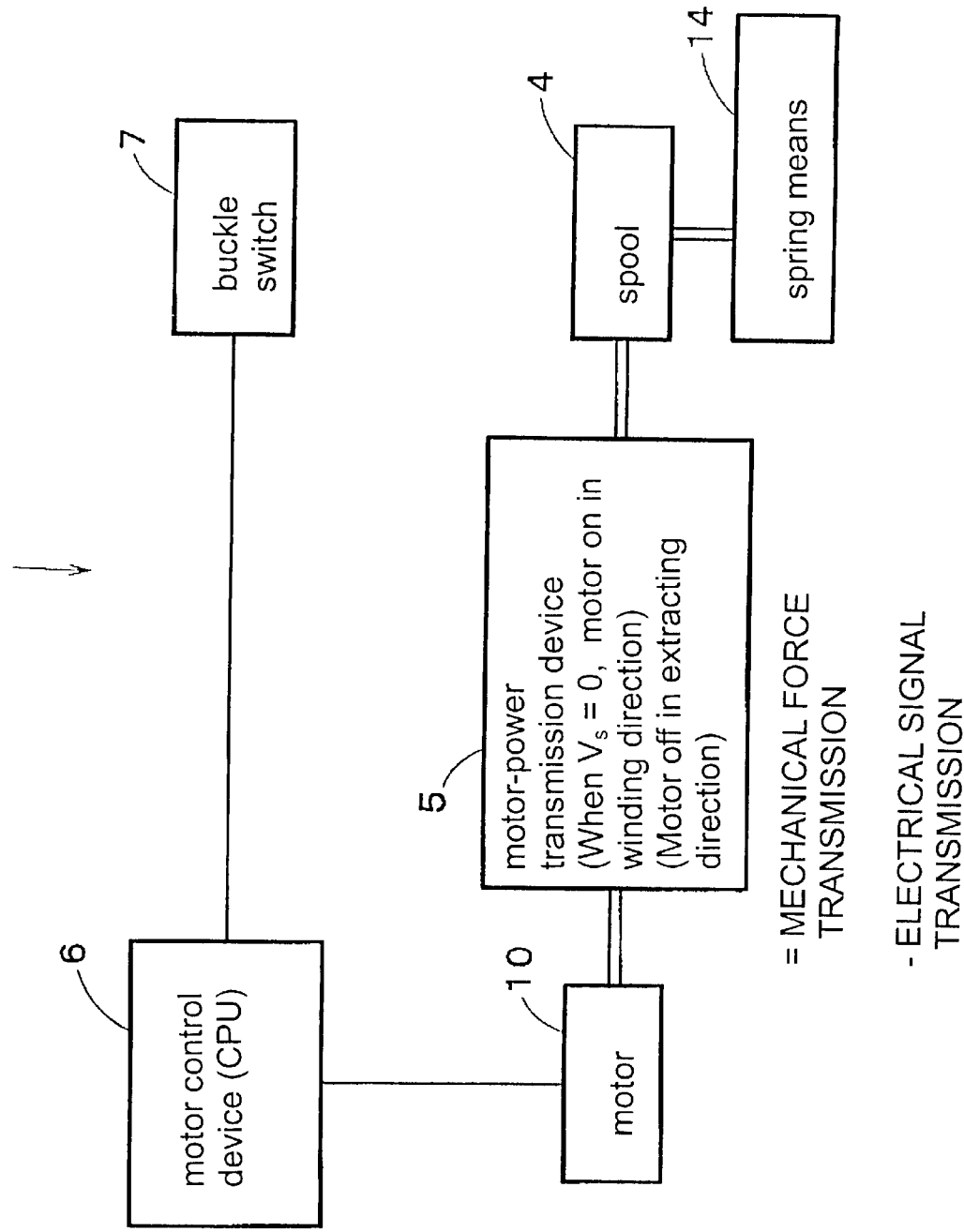
FIG. 4 is a schematic drawing showing a configuration of the seatbelt retractor shown in FIG. 1 relating to the present invention.
Figure 5:
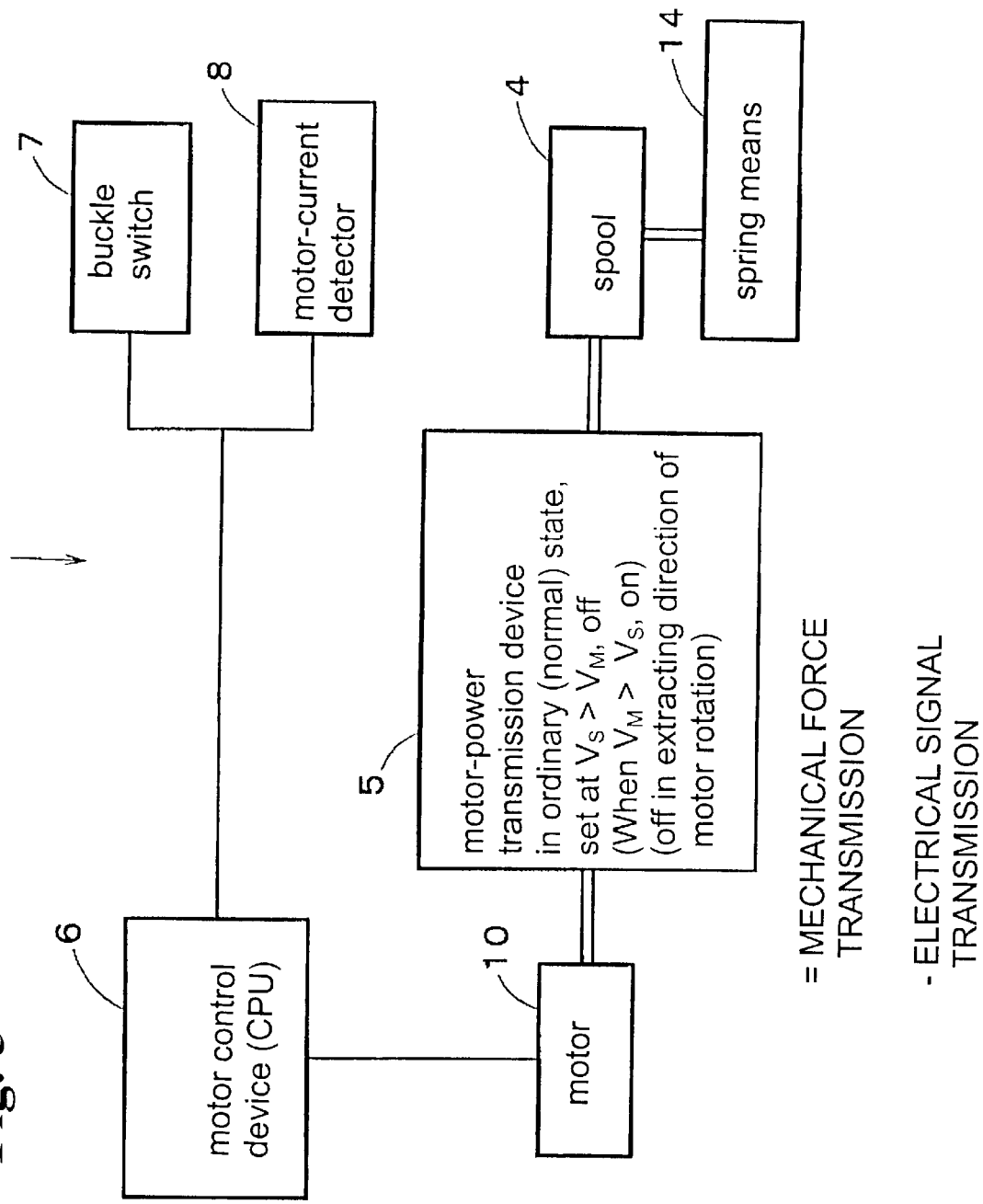
FIG. 5 is a schematic drawing similar to FIG. 4 showing a seatbelt retractor according to an embodiment of the present invention.

FIG. 5 schematically shows a seatbelt retractor according to an embodiment of the present invention similar to FIG. 4.

In addition, the same reference numerals designate the same components in FIGS. 1 to 4 of the patent publication described above, and the detailed description thereof is omitted.

As shown in FIG. 5, in the seatbelt retractor 1 according to the embodiment, as opposed to the seatbelt retractor 1 of the patent publication described above, a motor-current detection signal from a motor current detector 8 is further supplied to a motor control device 6. Also, in a normal state (i.e. a return spring 54 of the spring means 14 has substantially initial spring characteristics without changes in the spring characteristics due to aging or the like), in the seatbelt retractor 1 according to the embodiment, a rotational speed $V_S$ of the internal gear 44 of the motor-power transmission device 5 in a belt winding CCW direction during the winding of the seatbelt webbing 3 by the spring means 14 is set to be larger than a rotational speed $V_M$ of the internal gear 44 in a belt extracting CW direction during the rotation of the motor 10 in the belt winding CCW direction ($V_S > V_M$).

Figure 6:
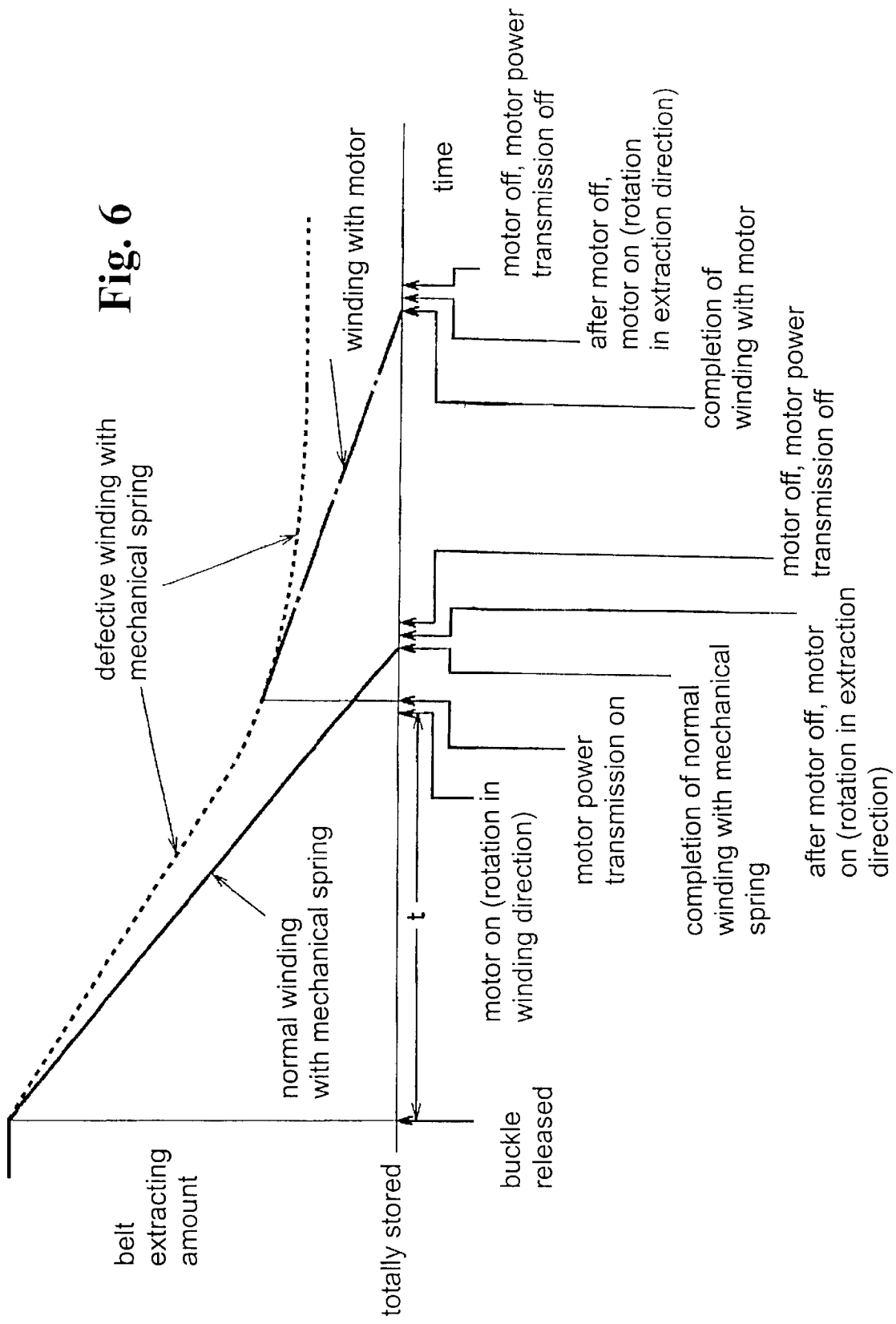
FIG. 6 is a graph illustrating a belt-winding operation of the seatbelt retractor shown in FIG. 5.

Furthermore, as shown in FIG. 6, in the seatbelt retractor 1 according to the embodiment, when a tongue is removed from a buckle in wearing the seatbelt webbing 3, the seatbelt webbing is mechanically wound about the spool 4 by the urging force of the return spring 54 of the spring means 14 in the same way as that of the conventional one. At this time, when the belt winding operation of the spring means 14 is normal as indicated by a solid line in FIG. 6, the entire amount of the seatbelt webbing is directly wound by the spring means 14 (the entire amount of the seatbelt webbing is stored by the spring means 14).

When the belt winding operation of the spring means 14 is not normal, and it is difficult to wind the entire amount of the seatbelt webbing, the entire amount of the seatbelt webbing, as indicated by a projected line in FIG. 6, is wound by the power of the motor 10. In this case, for winding the seatbelt webbing 3 by the motor 10, the motor-power transmission device 5 and the motor control device 6 are respectively configured as follows.

That is, when a winding speed $V_{BS}$ of the spool by the urging force of the spring means 14 is decreased under a constant value $V_{BSO}$, the rotational speed $V_s$ of the internal gear 44 during the winding of the seatbelt webbing 3 by the spring means 14 becomes smaller than the rotational speed $V_M$ of the internal gear 44 during the winding of the seatbelt webbing 3 by the power of the motor 10 ($V_S$ is smaller than $V_M$). Accordingly, the motor-power transmission device 5 automatically turns on, as described above.

Therefore, the power of the motor 10 is transmitted to the spool 4 so as to wind the seatbelt webbing 3 by the power of the motor 10. At this time, the motor control device 6 controls the motor 10 so as to wind the belt at a winding speed of the constant value $V_{BSO}$.

When the tongue is released from the buckle, the buckle switch 7 is turned off so that the buckle-engagement signal, which has been input to the motor control device 6, is off. When the buckle-release signal is sent to the motor control device 6, the motor control device 6 turns the motor 10 on in the belt winding direction after a lapse of a constant time $t_1$ since the buckle-release signal is supplied. At this time, when the belt winding by the spring means 14 is normal, the motor-power transmission device 5 does not turn on because $V_s$ is greater than $V_M$ as described above. Thus, even when the motor 10 rotates in the belt winding direction, the power of the motor 10 is not transmitted to the spool 4.

Furthermore, when the entire amount of the seatbelt webbing is wound by the spring means 14 in the normal state of the belt winding, the motor-power transmission device 5 turns on so that the power of the motor 10 is transmitted to the spool 4 because the spool 4 stops rotation so that VS becomes 0 (i.e. VM becomes greater than VS). However, since the spool 4 is in a state that the seatbelt webbing 3 can not be wound any more, the motor 10 becomes a stalled state. As a result, the winding load is increased and the motor current increases. The motor control device 6 detects the increase in the motor current based on a current detection signal from the motor current detector 8 so as to turn the rotation of the motor 10 off.

In addition, the motor 10 may also be set to stop after a further lapse of a constant time since the motor 10 is turned on after the lapse of the constant time t since the buckle is released. In this case, however, after the motor 10 is turned on, the seatbelt webbing 3 may be wound by the power of the motor 10 because of the abnormal winding of the seatbelt webbing 3 by the spring. Considering the case, therefore, the constant time is necessary to be set.

Moreover, since the motor-power transmission device 5 turns on after stopping the motor 10 due to the increase in the motor current, the motor control device 6 turns off the motor-power transmission device 5 by turning on the motor 10 in the opposite direction (i.e. in the belt extraction direction). That is, the power of the motor 10 is shut off to transmit to the spool 4, as well as the motor 10 is turned off after the motor-power transmission device 5 is turned off.

Furthermore, the motor control device 6 measures a period of time from the starting of the rotation of the motor 10 until the detection of increase in the motor current with a counter. According to the measured time count and the power of the motor 10, which is currently set, the power of the motor 10 is calculated so that the winding speed during winding by the power of the motor 10 becomes the constant value $V_{BSO}$. By using the obtained value as the power to be set next, the present power stored in the motor control device 6 is updated. When the power value obtained by the calculation is the same as the present power, the present power is maintained as it is.

Other configurations of the seatbelt retractor 1 according to the embodiment are the same as those shown in FIGS. 1 to 4 described above. Although not essential, the structure of the seatbelt retractor 1 of the present invention is the same as that disclosed in the patent publication. The detailed description of the seat belt retractor is herein omitted.

Next, a control of the seatbelt winding operation of the seatbelt retractor according to the embodiment configured as above will be described.

Figure 7:
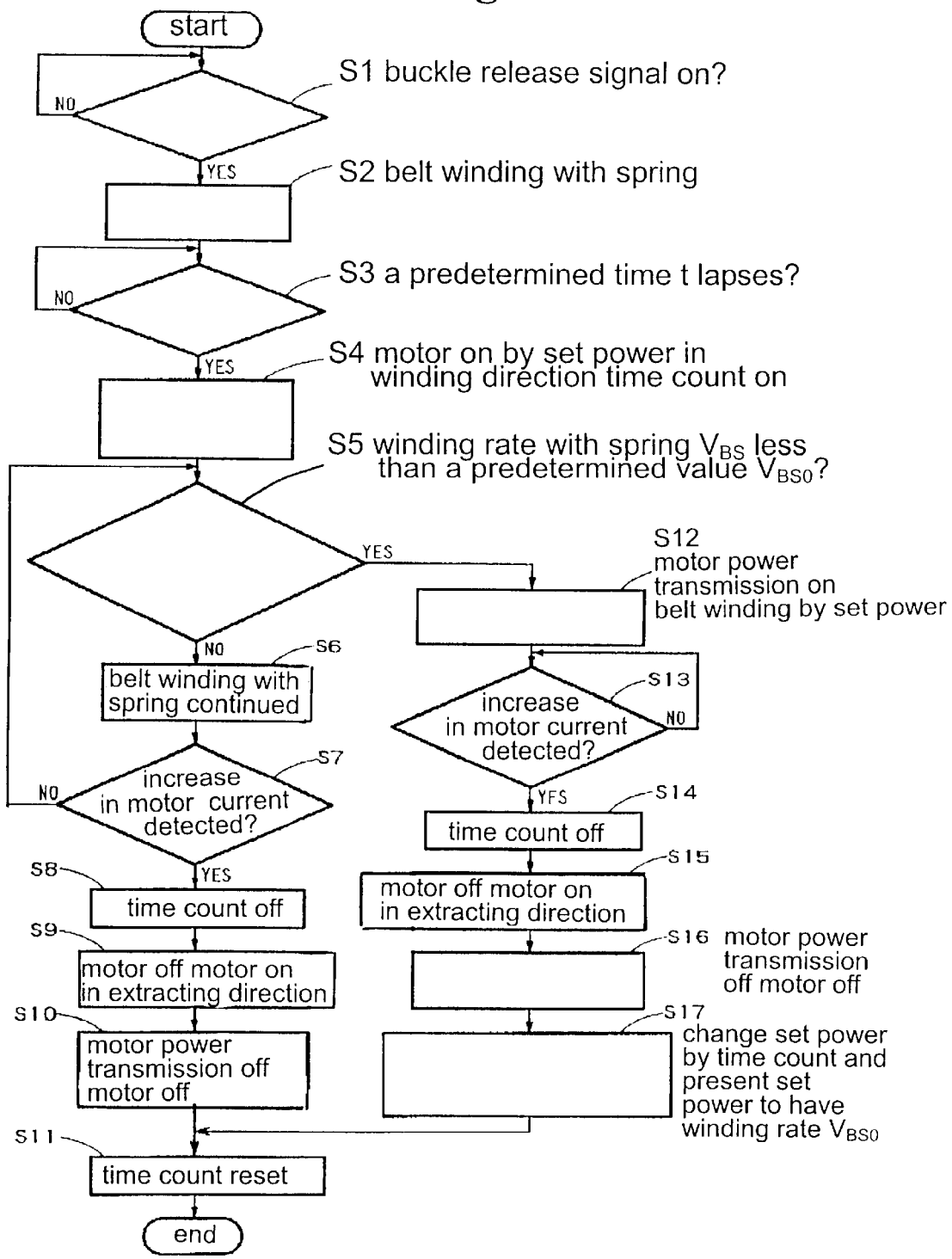
FIG. 7 is a flow chart showing the belt-winding operation of the seatbelt retractor shown in FIG. 5.

FIG. 7 is a flow chart showing the seatbelt winding operation. As shown in FIG. 7, first, at step S1, it is confirmed whether the buckle-release signal is sent from the buckle switch. If it is not the case, the process of step S1 is repeated. If it is the case, the tongue is released from the buckle and the spring means 14 is winding the belt at step S2. Then, at step S3, it is determined whether the predetermined time t is elapsed after the buckle-release signal is sent. If it is not the case, the process of step S3 is repeated. If it is the case, at step 4, the motor 10 is turned on so as to rotate in the belt winding direction while a counter (not shown) disposed within the motor control device (CPU) 6 starts to count time. At this time, the motor-power transmission device 5 is not turned on as mentioned above, so that the power of the motor 10 is not transmitted to the spool 4.

Next, at step S5, it is determined whether the belt winding speed $V_{BS}$ of the spring means 14 is smaller than the specific value $V_{BSO}$. If it is not the case, the belt winding by the spring means 14 is normal, so that the spring means 14 continues to wind the belt at step S6. Then, at step S7, it is determined whether the increase in the motor current is detected. If it is not the case, the spring means 14 does not complete winding the belt. Thus, the process returns to step S5, and each step after step S5 is repeated. When the increase in the motor current is determined to be detected, the time counting is stopped at step S8. After the motor 10 is turned off at step S9, the motor is turned on in the opposite direction, i.e. the belt extraction direction. Subsequently, at step S10, the motor-power transmission device 5 is turned off while the motor 10 is turned off. Furthermore, at step S11, the time counting value of the counter is reset to zero. In such a manner, the winding of the seatbelt webbing 3 by the spring means 14 is completed.

At step S5, if the winding speed $V_{BS}$ is determined to be smaller than the specific value $V_{BSO}$, the spring means 14 is not winding the seatbelt webbing 3 in a normal way. Thus, the motor-power transmission device 5 is turned on at step S12, and the motor 10 with the power controlled at the set value starts to wind the belt. Then, at step S13, in the same way as at step S7 mentioned above, it is determined whether the increase in the motor current is detected. If it is not the case, the motor 10 does not complete winding the belt. Thus, the process at step S13 is repeated. If it is the case, the time counting is stopped in the same way as step S8 mentioned above. After the motor 10 is turned off at step S15, the motor is turned on in the opposite direction, i.e. the belt extraction direction. Subsequently, at step S16, the motor-power transmission device 5 is turned off while the motor 10 is turned off. Furthermore, at step S17, based on the measured value of the time counter and the current power, the power is calculated so as to update the power to be the calculated value. When the calculated value is the same as the current set power, the current set power is maintained as it is. Then, at step S11, the measured value of the time counter is reset to zero. In such a manner, the motor 10 completes winding the seatbelt webbing 3.

In such a manner, in the seatbelt retractor 1 according to the embodiment, even when the winding force due to the spring can not be efficiently utilized because of the aging and the like, the entire amount of the seatbelt webbing can be securely wound up.

In addition, according to the embodiment described above, the retainer lever 49 of the power-transmission route switching mechanism 13 is mechanically operated. Also, the motor-power transmission device 5 is turned on and off by mechanically engaging the ratchet gear 44b of the internal gear 44 with the retainer lever 49 by a difference in the rotations between the motor 10 and the spool. Alternatively, an electric force or an electromagnetic force may operate the retainer lever 49 of the power-transmission route switching mechanism 13, and the motor control device 6 may turn on and off the motor-power transmission device 5 by controlling the operation of the retainer lever 49.

As apparent from the description above, in the seatbelt retractor according to the present invention, when the winding speed during the winding of the seatbelt webbing by the spring is decreased under the predetermined value, the motor-power transmission device is turned on to connect the motor-power transmission path, so that the motor power winds the seatbelt webbing about the spool. Therefore, even when the winding force due to the spring can not be effectively utilized, the entire amount of the seatbelt webbing can be securely wound up.

In particular, in the second aspect of the invention, when the winding speed of the seatbelt webbing during winding by the spring is decreased to be less than the predetermined value so that the winding speed by the motor power rather becomes larger than the winding speed of the seatbelt webbing during winding by the spring, which is input in the motor-power transmission device, the motor-power transmission device turns on. Thus, the power of the motor is transmitted to the spool through the motor-power transmission device. Therefore, the motor-power transmission path is simply connected mechanically so that the seatbelt webbing is wound about the spool by the motor power.

In the third aspect of the invention, the completion of seatbelt winding by the spool is determined by detecting a state that the motor stalls and the motor current increases thereupon. In such a manner, by simply detecting the increase in the motor current, the completion of seatbelt winding can be simply detected, so that the motor is securely stopped.

Furthermore, in the fourth aspect of the invention, the motor control device controls a driving output of the motor according to a period of time from the start of the motor rotation in the belt winding direction to the detection of the increase in the motor current. In such a manner, by controlling the driving output of the motor according to an extent of difficulty in utilizing the winding force of the spring efficiently, the driving of the motor is optimally controlled so that the motor power can be utilized efficiently.

While the invention has been explained with respect to the specific embodiments, the explanation is illustrative and the invention is limited only by the appended claims.

What is claimed is:

1. A seatbelt retractor comprising:

a seatbelt webbing, a tongue attached to the seatbelt webbing, a buckle to be connected to the tongue and having a buckle switch for sending a signal when detecting release of the tongue from the buckle, a spool on which the seatbelt is wound, a spring attached to the spool for urging the same to wind the seatbelt webbing in a belt winding direction, a motor for driving the spool to wind the seatbelt webbing in the belt winding direction, a motor-power transmission path disposed between the spool and the motor for transmitting power of the motor to the spool, a motor-power transmission device connected to the motor-power transmission path for turning on and off the same, said motor-power transmission device turning only when the motor rotates in the belt winding direction, thereby to connect the motor-power transmission path and transmit the power of the motor to the spool, said motor-power transmission device turning on to connect the motor-power transmission path when a winding speed of the seatbelt webbing by the spring becomes smaller than a predetermined value, and a motor control device electrically connected to the buckle switch and the motor for controlling the same, said motor control device starting the motor to rotate in the belt winding direction after a predetermined period of time since the signal from the buckle switch is received.

2. A seatbelt retractor according to claim 1, wherein said motor-power transmission device is turned off to shut off the motor-power transmission path in a normal state by setting a winding speed of the seatbelt webbing by the spring input in the motor-power transmission device to be greater than a winding speed of the seatbelt webbing by the motor input in the motor-power transmission device, and said motor-power transmission device is turned on so as to connect the motor-power transmission path by increasing the winding speed of the seatbelt webbing by the motor input in the motor-power transmission device to be greater than the winding speed of the seatbelt webbing by the spring input in the motor-power transmission device when the winding speed of the seatbelt webbing by the spring is less than a constant value.

3. A seatbelt retractor according to claim 1, further comprising a motor current detector electrically connected to the motor and the motor control device for detecting an electrical current in the motor and sending a motor current detection signal to the motor control device, wherein said motor control device stops the motor when the motor control device receives the motor current detection signal from the motor current detector indicating an increase in the current by that an entire amount of the seatbelt webbing is completely wound on the spool.

4. A seatbelt retractor according to claim 3, wherein said motor control device measures a period of time from a start of the motor rotation in the belt winding direction to a detection of the increase in the motor current so that the motor device can control a driving output of the motor according to the measured time.

* * * * *